Nov. 6, 1951  A. GISLON ET AL  2,574,325
MANUFACTURE OF ALCOHOLS FROM OLEFINS
Filed Oct. 15, 1947  3 Sheets-Sheet 1

INVENTORS
ANDRÉ GISLON AND
ANDRÉ MARIE VALET
By Blair Curtis & Hayward
ATTORNEYS André Gislon and
André Marie Valet Nov. 6, 1951     A. GISLON ET AL     2,574,325
MANUFACTURE OF ALCOHOLS FROM OLEFINS
Filed Oct. 15, 1947     3 Sheets-Sheet 3
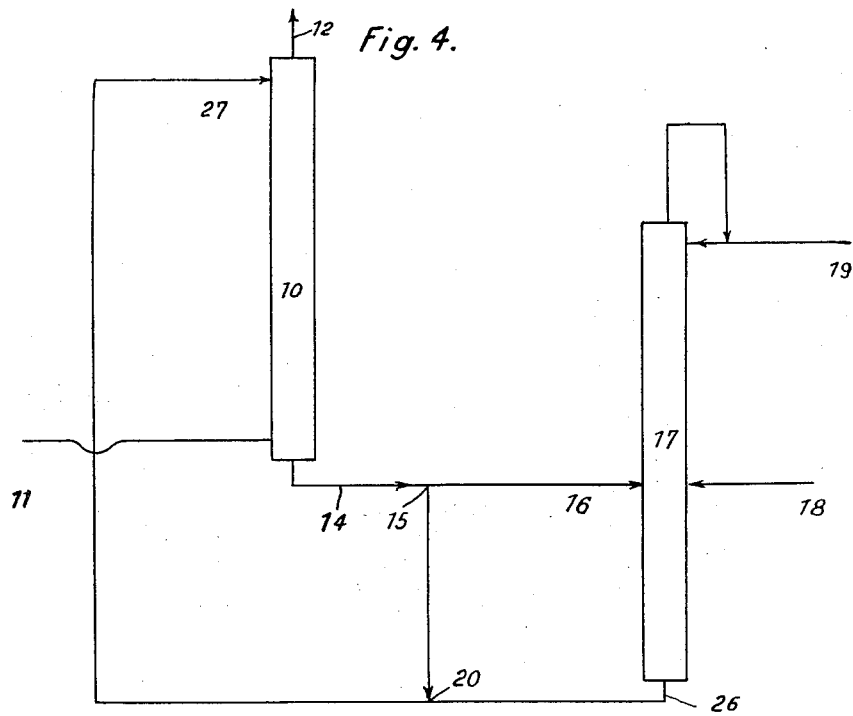
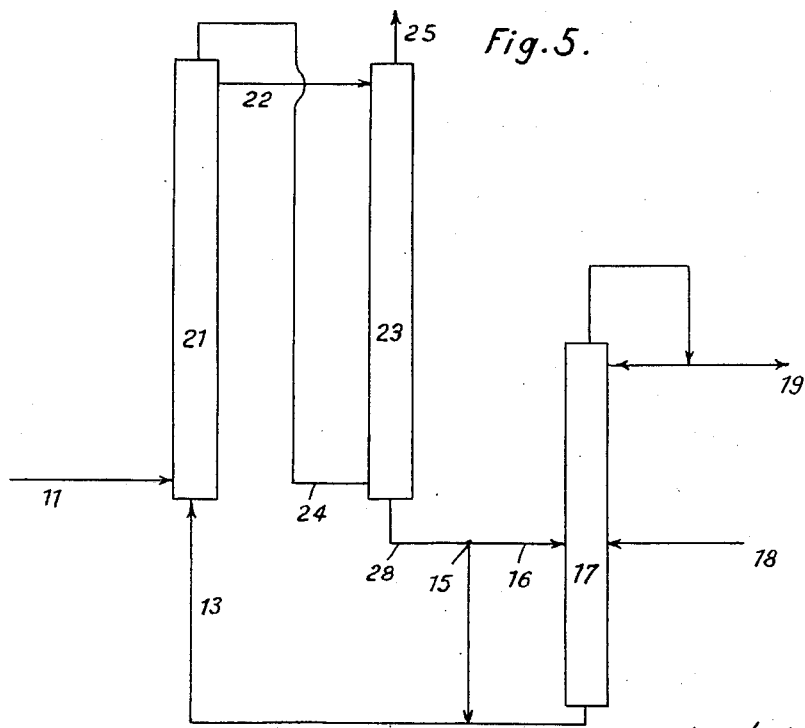
André Gislon and
André Marie Valet Patented Nov. 6, 1951

2,574,325

UNITED STATES PATENT OFFICE 2,574,325

MANUFACTURE OF ALCOHOLS FROM OLEFINS

André Gislon and André Marie Valet, Paris, France, assignors to Compagnie Française de Raffinage (Société Anonyme), Paris, France Application October 15, 1947, Serial No. 780,018
In France August 23, 1946

Section 1, Public Law 690, August 8, 1946
Patent expires August 23, 1966

4 Claims. (Cl. 260—639)

It is well known that alcohols may be manufactured from their corresponding olefins by submitting these latter to the action of the aqueous sulfuric acid. This can be done under atmospheric pressure or under a higher pressure. The working temperature and the concentration of the sulfuric acid utilized are determined by the nature of the olefine to be treated so as to obtain only alcohol, to the exclusion of polymerization products. The aqueous sulfuric solution is then distilled in a known manner in order to extract therefrom the alcohol formed and to regenerate the sulfuric acid, which can then be reutilized for the hydration of olefines.

To be more precise, in order to absorb an olefine of a mixture comprising varied olefinic or saturated hydrocarbon, etc., one submits the gas to the action of a sulfuric solution under conditions of temperature, of pressure, and of acid concentration suitable to the selective or integral absorption of one of the mixed olefines.

Applicants have observed that the speed of absorption of the olefine depends not only on the temperature of reaction and on the concentration of the acid, but also on the alcohol content of the absorption bath; and they have established that this speed is maximum for a particular alcohol concentration in the hydration bath.

Figure 1:
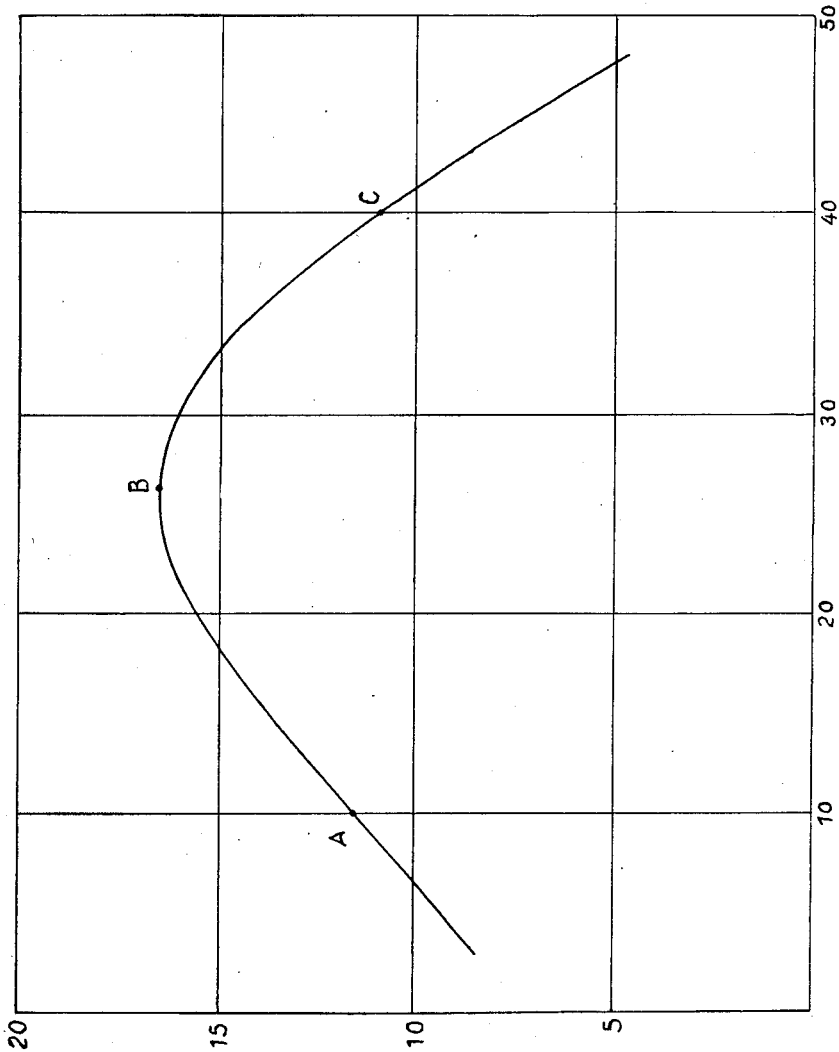

This relationship is shown in Fig. 1 of the accompanying drawing, which constitutes a typical curve and shows, in the case considered, the speed of absorption of isobutylene in 40% sulfuric acid at 50° C. and under atmospheric pressure.

On this curve, the abscissae correspond to the percentage of alcohol in the hydration bath and the ordinates correspond to the amount of olefine absorbed per kg. of hydration bath, this amount being evaluated in liters per hour.

Applicants have been led by the study of this graph to utilize in connection with the known methods and processes of synthesis of alcohols by hydration of the olefines the following improvements, which form the object of the present invention.

To start with, as it is interesting to proceed always under the conditions where the speed of absorption is maximum, one should effect the hydration in a bath initially containing a certain amount of alcohol. For instance, one can start with a bath containing A% of alcohol and enrich it up to the concentration B% or C%. This enriched bath, charged with alcohol, can then be subdivided in two parts, one of which is distilled by any suitable method, so as to extract all the alcohol and to regenerate the acid to the concentration suitable to the hydration; while the other part, without being distilled, is re-cycled with the acid coming from the distillation so as to give a mixture of A% of alcohol and this mixture is passed to the hydration bath.

Figure 2:
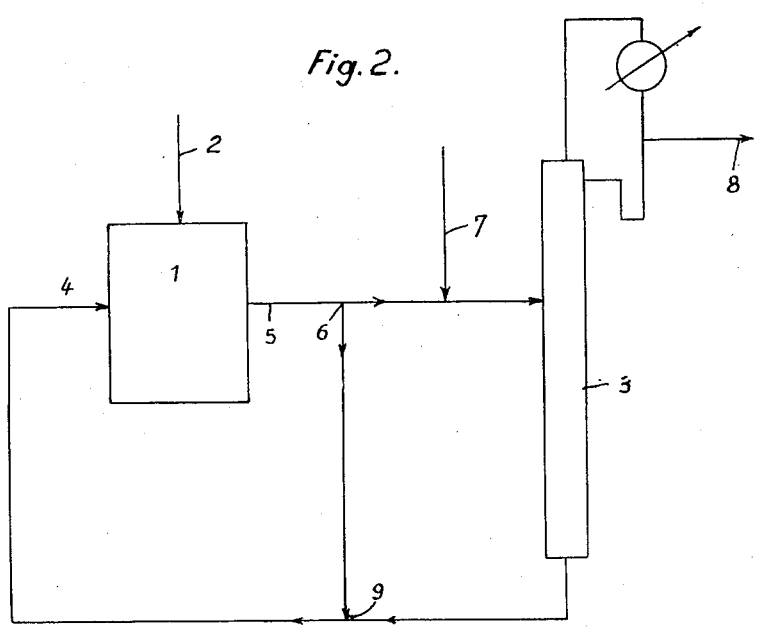

Fig. 2 illustrates schematically apparatus capable of carrying out this type of operation.

Referring to Fig. 2:

1 designates the vat in which the hydration takes place; 2 is the supply of olefine and 3 the distillation column.

The vat 1 receives, as at 4, a sulfuric acid solution containing A% of alcohol. The bath in the vat 1 containing B% of alcohol, which is extracted, as at 5, is divided, as at 6, in two parts: one part, to which is added water, as at 7, is led to the distillation column 3, at the top of which a mixture of alcohol and water is collected, as at 8; while the other part is mixed at 9 with the sulfuric acid without alcohol coming from the column 3 and returns, as at 4, to the hydration vat 1.

Furthermore, the study of this graph (Fig. 1) permits accurate determination of the preferred absorption system, in every case where, the olefine under treatment being diluted with another gas, one has to effect a selective absorption.

If, starting from an acid containing A% of alcohol, one enriches it up to the concentration B%, one observes that the activity of the bath increases as the hydration takes place. Therefore, it is of interest, in such a case, to circulate the acid bath and the olefinic gases in parallel currents, in order that the most active bath be in contact with the gas that is poorest in olefines.

Figure 3:
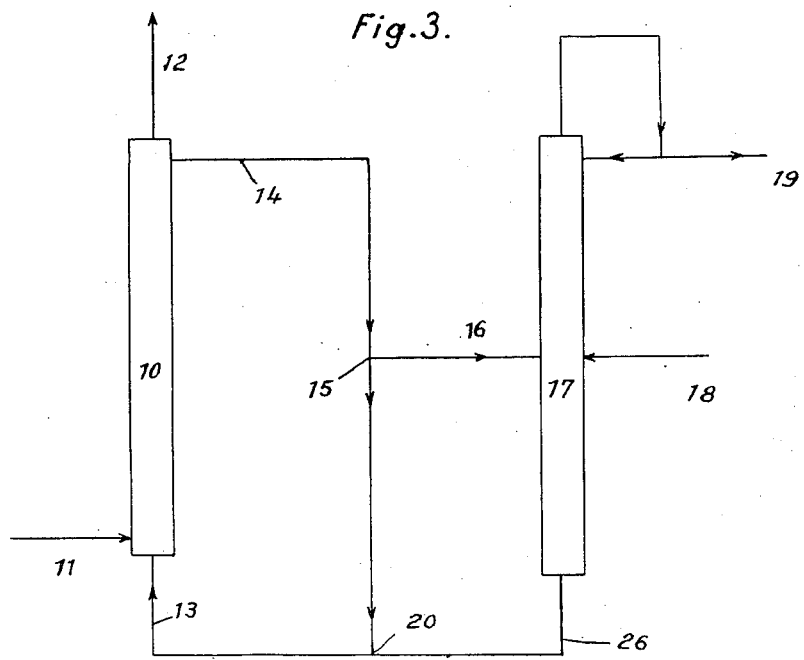

Apparatus for this type of operation is shown on Fig. 3.

Referring to Figure 3:

10 indicates the hydration tower receiving, on the one side, as at 11, olefine diluted in an inert gas—which escapes out of the tower, as at 12—and, on the other side, as at 13, a sulfuric acid solution containing A% of alcohol. The solution at the top of tower 10, charged with B% of alcohol and which is extracted, as at 14, is divided, as at 15, in two parts: a first part directed, as at 16, toward a column of separation 17, which is fed with water, as at 18, and at the top of which one collects, as at 19, the mixture alcohol + water; and a second part of which is mixed at 20 with the alcohol free sulfuric acid coming from the column 17 and returning, as at 13, to the hydration tower.

It will be seen, that in the tower 10, the most active bath (B% of alcohol) is in contact with the gas poorest in olefines.

If, starting from an acid containing B% of alcohol, one enriches it up to the concentration C%, one observes that the activity of the bath decreases as the hydration takes place. In this case, one should therefore circulate the acid bath and the olefinic gases countercurrently in order that the least active bath be in contact with the richest gases. Apparatus capable of carrying out this type of operation is shown on Fig. 4.

Referring to Fig. 4, one will find most of the references already used in Fig. 3 designate the same elements, but, in this apparatus, the tower 10 is fed at its top, as at 27, with a sulfuric acid solution containing B% of alcohol and a solution enriched up to the concentration C% is extracted at the bottom of this tower.

One can see that in the tower 10, the least active bath (C% of alcohol) is in contact with the gas richest in olefines.

Nevertheless, either of these methods presents the inconvenience of limiting substantially, the margin of enrichment of the bath in alcohol. Therefore, it is more advantageous, starting with an absorbing bath containing A% of alcohol, to continue the reaction until one reaches C% of alcohol while maintaining a high average state of absorption and conditions satisfactory for the ultimate extraction of the alcohol. One can see therefore that it is advantageous to operate in two steps, according to the diagram of Fig. 5.

In the first step, the acid containing A% of alcohol, which enters, as at 13, a first tower 21, flows in parallel current with the olefinic gases to be treated arriving, as at 11, in said tower 21. At the top of this tower 21, the alcohol concentration reaches B%. The solution is then directed, through 22, into the top of a second tower 23, in which, in the second step, it flows in counter-current relation with respect to the incompletely exhausted gases issuing from the first tower 21 and directed, through 24, into the bottom part or base of this second tower 23. The gases completely exhausted escape, as at 25. The solution collecting at the bottom or base of the second tower 23 contains C% of alcohol.

The following examples are merely illustrative of the application of the present invention to the treatment of a fraction of cracking gas containing 65% of butane and isobutane, 20% of butylene and 15% of isobutylene in order to obtain tertiary butanol by selective hydration of the isobutylene.

*1st example.*—In order to achieve selective hydration of the isobutylene contained in a $C^4$ cut of aliphatic hydrocarbons containing 15% by weight of isobutylene and 85% of butanes and n-butylenes, one feeds to the hydration tower 10 and into the pipe 11 (Fig. 3) 128 kgs. per hour of hydrocarbons and 5.5 kgs. of water, necessary for the hydration. At 13, one introduces 100 kgs. of an hydrating solution containing by weight 90 parts of sulfuric acid at 40% and 10 parts of tertiary butyl alcohol.

The hydrating solution, at 50° C., and the hydrocarbons travel parallel in the tower from which one withdraws, through the pipe 12, at the top, 128 kgs. of hydrocarbons containing only 1.18% of isobutylene. Through the pipe 14, one withdraws 123.2 kgs. of hydrating solution enriched with 23.2 kgs. of alcohol. A part of this solution, that is 86.1 kgs. is sent through the pipe 16 into the separation column 17, while the rest, that is 37.1 kgs. of hydrating solution containing alcohol is returned directly, into the tower 10.

From the column 17, one withdraws from the top 19 thereof, the tertiary butyl alcohol produced in the form of an azeotropic mixture containing 88% of alcohol, and, at the bottom or base 26, 40% aqueous sulfuric acid, free of alcohol assuming that a quantity of water corresponding to the azeotropic mixture has been introduced into the distillation columns 17 and 18.

*2nd example.*—In order to achieve, as in the first example, a selective hydration of a $C^4$ cut of hydrocarbons containing 15% of isobutylene, but using this time, at ordinary room temperature, a bath of 40% sulfuric acid, for which the maximum activity, as attained by a concentration of about 19% of tertiary butenol in the hydrating bath: one feeds to the hydration tower 10, through the pipe 11 (Fig. 4), 128 kgs. per hour of hydrocarbons and 5.8 kgs. of water necessary for the hydration. At 27, one introduces 100 kgs. per hour of an hydrating solution containing by weight 80.5 parts of sulfuric 40% acid and 19.5% parts of tertiary butyl alcohol. The hydrating solution, kept at ordinary room temperature, and the hydrocarbons travel in opposite directions in the tower, from which one withdraws, through the pipe 12, at the top, 110 kgs. of hydrocarbon containing only 1.1% of isobutylene. Through the pipe 14, one withdraws 123..8 kgs. of hydrating solution enriched of 23.8 kgs. with alcohol. A part of this solution, that is 68 kgs. is sent into the separation column 17, while the rest, that is 55.8 kgs. including its associated alcohol returns directly, into the tower 10.

From the column 17, one withdraws from the top 19 thereof, the tertiary butyl alcohol produced in the form of an azeotropic mixture containing 88% of alcohol, and, at the bottom or base 26, 40% aqueous sulfuric acid, free of alcohol, assuming that a quantity of water corresponding to the azeotropic mixture has been introduced into columns 17 and 18.

*3rd example.*—In order to achieve selective hydration of a $C^4$ cut of aliphatic hydrocarbons containing 15% of isobutylene, one takes, at ordinary room temperature, a 50% sulfuric acid solution. In this case, the maximum activity is obtained with about 29% of tertiary butanol in the hydrating bath.

One feeds to the hydration tower 21, through the pipe 11 (Fig. 5), 260 kgs. per hour of hydrocarbons and 12.2 kgs. of water necessary for the hydration. In 13, one introduces 100 kgs. per hour of an hydrating solution containing by weight 91.5 parts of 50% sulfuric acid and 8.5 parts of tertiary butyl alcohol. The hydrating solution, at 50° C. and the hydrocarbons travel in parallel in the tower 21. From the top of this tower 21, the hydrating solution, enriched up to about 29% of tertiary butanol, passes directly into the tower 23, through the pipe 22, while the incompletely exhausted gases are sent, through 24, at the bottom of the tower 23, to cause the two fluids to flow in opposite directions i. e., countercurrently through the tower 23. At 25, one withdraws 222 kgs. of exhausted gases, which contain only about 0.5% of isobutylene, while at 28, one withdraws 150 kgs. of absorbing solution enriched with 50 kgs. of alcohol. A part of this solution, that is 125 kgs., is led to the column 17, while the rest, that is 25 kgs., including the alcohol associated therewith returns directly, to the tower 21. From the column 17, one withdraws from the top 19 thereof, as in the preceding examples, the azeotropic mixture of alcohol and water and one recovers 50% sulfuric acid, assuming that the quantity of water necessary to form the azeotrope has been added.

What we claim is:

1. A process for making alcohols which comprises, continuously feeding an olefine to an aqueous acid bath to absorb said olefine in the bath and hydrate said olefine to an alcohol, continuously removing alcohol-containing acid solution from said bath, feeding a first portion of said removed solution to a column to separate by distillation alcohol and water in said solution from the acid, recirculating the remainder of said removed solution directly to said bath, returning the acid from said distillation step to said bath and regulating the proportions of said first portion of removed acid solution and said remainder of removed acid solution to maintain the alcohol concentration in said bath approximately at an optimum value that produces the maximum olefine absorption rate.

2. A process as claimed in claim 1 and wherein the alcohol concentration in said bath is initially at a value below said optimum value and said olefine is caused to flow concurrently with said bath to cause said olefine to be absorbed in said bath and hydrated.

3. A process as claimed in claim 1 and wherein the alcohol concentration in said bath is initially at a value above said optimum value and said olefine is caused to flow countercurrently with respect to said bath to cause said olefine to be absorbed in said bath and hydrated.

4. A process as claimed in claim 1 and wherein the alcohol concentration in said bath is initially at a value below said optimum value and said olefine is caused to flow first concurrently with said bath until the alcohol concentration in said bath is approximately said optimum value, and then countercurrently with respect to said bath to cause further quantities of olefine to be absorbed in said bath and hydrated.

ANDRÉ GISLON.
ANDRÉ MARIE VALET.

REFERENCES CITED

The following references are of record in the file of this patent:

UNITED STATES PATENTS

| Number | Name | Date |
|---|---|---|
| 2,055,720 | Francis | Sept. 29, 1936 |
| 2,109,462 | Burk et al. | Mar. 1, 1938 |
| 2,228,027 | Bent et al. | Jan. 7, 1941 |
| 2,296,696 | Babcock | Sept. 22, 1942 |
| 2,313,196 | Guinot | Mar. 9, 1943 |
| 2,474,568 | Bannon et al. | June 28, 1949 |